(12) United States Patent
Ueno et al.

(10) Patent No.: US 10,356,883 B2
(45) Date of Patent: Jul. 16, 2019

(54) LIGHTING SYSTEM, TERMINAL, AND METHOD FOR SETTING LIGHTING SYSTEM

(71) Applicant: Panasonic Intellectual Property Management Co., Ltd., Osaka (JP)

(72) Inventors: Saori Ueno, Osaka (JP); Kentaro Yamauchi, Hyogo (JP); Sana Yagi, Osaka (JP); Shinsuke Nishioka, Osaka (JP); Natsuka Nakauchi, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 11 days.

(21) Appl. No.: 15/453,360

(22) Filed: Mar. 8, 2017

(65) Prior Publication Data
US 2017/0265285 A1    Sep. 14, 2017

(30) Foreign Application Priority Data
Mar. 10, 2016 (JP) ................................ 2016-047074

(51) Int. Cl.
*H05B 33/08* (2006.01)
*G06F 3/0481* (2013.01)
(Continued)

(52) U.S. Cl.
CPC ..... *H05B 37/0272* (2013.01); *G06F 3/04817* (2013.01); *G06F 3/04847* (2013.01); *H05B 33/0845* (2013.01); *H05B 33/0863* (2013.01)

(58) Field of Classification Search
CPC ............ H05B 37/0272; H05B 33/0842; H05B 33/0845; H05B 33/0857; H05B 37/0263;
(Continued)

(56) References Cited

U.S. PATENT DOCUMENTS

2010/0259931 A1* 10/2010 Chemel ................ H05B 37/029
362/249.02
2013/0249441 A1* 9/2013 Roosli ................ H05B 37/0245
315/312
(Continued)

FOREIGN PATENT DOCUMENTS

JP    2003-068475 A    3/2003
JP    2011-128887 A    6/2011
(Continued)

*Primary Examiner* — Tung X Le
*Assistant Examiner* — Borna Alaeddini
(74) *Attorney, Agent, or Firm* — McDermott Will & Emery LLP

(57) ABSTRACT

A lighting system includes a plurality of lighting devices and a terminal. The terminal includes a display screen, an input unit, a communication unit, and a device controller. The device controller (i) obtains, from outside the terminal, setting information including attribute information indicating at least one attribute regarding an installation location of each of the plurality of lighting devices, (ii) associates each of the plurality of lighting devices with any of the at least one attribute indicated by the attribute information included in the obtained setting information according to a dialog with an operator using the display screen and the input unit of the terminal, so as to classify the plurality of lighting devices under groups.

12 Claims, 11 Drawing Sheets

(51) Int. Cl.
*G06F 3/0484* (2013.01)
*H05B 37/02* (2006.01)

(58) Field of Classification Search
CPC .......... H05B 33/0833; H05B 37/02; H05B 37/0281; G06F 3/0488; G06F 3/04817; G06F 3/04842; G06F 3/04847; G06F 3/0482; G06F 3/0484; G06F 19/00; G06F 19/3493; G06F 21/6245; G06F 2221/2111; G06F 3/01; G06F 3/011; G06F 3/03547; G06F 3/048
See application file for complete search history.

(56) References Cited

U.S. PATENT DOCUMENTS

| | | | | |
|---|---|---|---|---|
| 2014/0070707 | A1* | 3/2014 | Nagazoe | H04B 10/116 315/151 |
| 2014/0106735 | A1* | 4/2014 | Jackson | H04W 8/245 455/419 |
| 2014/0375222 | A1* | 12/2014 | Rains, Jr. | H05B 37/0245 315/158 |
| 2015/0007038 | A1* | 1/2015 | Sasaki | G06F 3/04817 715/736 |
| 2016/0095192 | A1* | 3/2016 | Vangeel | G06F 8/654 315/153 |

FOREIGN PATENT DOCUMENTS

| | | |
|---|---|---|
| JP | 2012-227013 A | 11/2012 |
| JP | 2014-056670 A | 3/2014 |
| JP | 2015-018636 A | 1/2015 |

\* cited by examiner

FIG. 5

(a) PLEASE SELECT NAME OF ATTRIBUTE TO BE SET USING ATTRIBUTE AND THE-NUMBER-OF-DEVICES TABLE, AND SELECT DEVICE ICONS TO BE CLASSIFIED UNDER GROUP IN THE DRAWING

[SELECTED LIGHTING PLAN]
PLAN 1   SIMULATION IMAGE

[DRAWING]

[ATTRIBUTE AND THE-NUMBER-OF-DEVICES TABLE]

| GROUP ATTRIBUTE NAME | THE NUMBER OF DEVICES |
|---|---|
| WINDOW | 3 |
| SEAT | 0 |
| AISLE | 0 |

(b) PLEASE SELECT DEVICE ICONS TO BE ASSOCIATED WITH ATTRIBUTE "SEAT"

[SELECTED LIGHTING PLAN]
PLAN 1   SIMULATION IMAGE

[DRAWING]

[ATTRIBUTE AND THE-NUMBER-OF-DEVICES TABLE]

| GROUP ATTRIBUTE NAME | THE NUMBER OF DEVICES |
|---|---|
| WINDOW | 4 |
| SEAT | 4 |
| AISLE | 3 |

(c) PLEASE PRESS "END" BUTTON AFTER SELECTING ALL DEVICE ICONS

[SELECTED LIGHTING PLAN]
PLAN 1   SIMULATION IMAGE

[DRAWING]

[ATTRIBUTE AND THE-NUMBER-OF-DEVICES TABLE]

| GROUP ATTRIBUTE NAME | THE NUMBER OF DEVICES |
|---|---|
| WINDOW | 4 |
| SEAT | 12 |
| AISLE | 3 |

END

FIG. 9

| LIGHTING PLAN | TIME | ATTRIBUTE | DIMMING [%] | COLOR TEMPERATURE [K] | ENERGY-SAVING * NORMAL DEVICE COMPARED TO CASE IN WHICH ALL DEVICES ARE ON AT DIMMING RATE OF 100% |
|---|---|---|---|---|---|
| ENERGY-SAVING (ONLY WHITE / DIMMING) [CHECK DETAILED INFORMATION] | 8:00 - 16:00 | WINDOW | 70 | 5500 | 80% |
| | | SEAT | 80 | | |
| | | AISLE | 70 | | |
| | 16:00 - 20:00 | WINDOW | 70 | | |
| | | SEAT | 70 | | |
| | | AISLE | 60 | | |
| | 20:00 - 8:00 | WINDOW | 60 | | |
| | | SEAT | 60 | | |
| | | AISLE | 60 | | |
| ENERGY-SAVING (WHITE, WARM WHITE/ DIMMING) [CHECK DETAILED INFORMATION] | 8:00 - 16:00 | WINDOW | 70 | 5500 | 75% |
| | | SEAT | 80 | 5500 | |
| | | CONSULTATION AREA | 70 | 4500 | |
| | | AISLE | 70 | 6000 | |
| | 16:00 - 20:00 | WINDOW | 70 | 4500 | |
| | | SEAT | 70 | 4500 | |
| | | CONSULTATION AREA | 70 | 3500 | |
| | | AISLE | 60 | 6000 | |
| | 20:00 - 8:00 | WINDOW | 60 | 4500 | |
| | | SEAT | 60 | 4500 | |
| | | CONSULTATION AREA | 60 | 3500 | |
| | | AISLE | 60 | 6000 | |
| HEALTHY (CIRCADIAN ADJUSTMENT DIMMING AND COLOR ADJUSTMENT) [CHECK DETAILED INFORMATION] | 8:00 - 16:00 | WINDOW | 70 | 6000 | 70% |
| | | SEAT | 80 | | |
| | | AISLE | 70 | | |
| | 16:00 - 20:00 | WINDOW | 70 | 4500 | |
| | | SEAT | 70 | 4500 | |
| | | AISLE | 60 | 6000 | |
| | 20:00 - 8:00 | WINDOW | 60 | 4500 | |
| | | SEAT | 60 | 4500 | |
| | | AISLE | 60 | 6000 | |

LIGHTING SYSTEM, TERMINAL, AND METHOD FOR SETTING LIGHTING SYSTEM

CROSS REFERENCE TO RELATED APPLICATION

This application claims the benefit of priority of Japanese Patent Application Number 2016-047074 filed on Mar. 10, 2016, the entire content of which is hereby incorporated by reference.

BACKGROUND

1. Technical Field

The present disclosure relates to a lighting system, a terminal, and a method for setting a lighting system, and particularly to a lighting system including a plurality of lighting devices and a terminal which controls the plurality of lighting devices.

2. Description of the Related Art

In recent years, many shops differentiate themselves from others by using various lighting representation. In addition, an increasing number of offices, hospitals, etc. have a demand for helping employees to maintain their mental and physical health by lighting control that matches circadian rhythms.

At present, lighting systems having functions for setting dimming and color adjustment and schedules require that experts (for example, lighting designers) who know lighting products well and have excellent setting skills make the settings using user interfaces. However, the number of such experts is not enough to set all lighting systems according to requests from the purchasers thereof. It is to be noted that the settings of a lighting system include registering an identifier (a communication address) of each of lighting devices installed actually so as to make the lighting devices controllable (perform device mapping). Furthermore, the settings of the lighting system include classifying the lighting devices under groups, and determining scenes and schedules of dimming and color adjustment in lighting control under the groups. A scene is a lighting state which is determined based on a specific value of at least one of dimming and color adjustment. A schedule is a scene schedule, and, is for example, information defining scene changes dependent on time of a day.

In view of this, there are demands for lighting systems and user interfaces which allow persons other than lighting experts to make settings of lighting systems in middle-scale facilities, without difficult lighting control that always requires involvement of lighting experts.

Conventionally, various techniques for facilitating settings of lighting systems have been proposed (for example, see PTL 1 (Japanese Unexamined Patent Publication No. 2015-18636)).

According to the technique of PTL 1, in a lighting system capable of performing remote dimming control in which a plurality of lighting devices are controlled using a tablet terminal, the plurality of lighting devices are classified under at least a group with consideration of each of functions etc. thereof. The dimming and color adjustment state of the group can be checked on a display screen of the tablet terminal which serves as a controller for performing dimming of the arranged plurality of lighting devices. The plurality of lighting devices are displayed under the group so as to facilitate the settings of the lighting system. It is to be noted that the group of lighting devices is an assembly of lighting devices which are targets for the same lighting control.

SUMMARY

However, the technique of PTL 1 requires that a lighting expert is present at a site at which the plurality of lighting devices are installed although the technique enhances the user interface by the classification under the group depending on each of the functions of the plurality of lighting devices. In other words, even the technique of PTL1 requires that complicated settings for device mapping, classification of lighting devices under groups, scenes, schedules, etc. are made at the site at which the plurality of lighting devices are installed, and a lighting expert needs to be present at the site. For this reason, when no lighting expert is present at the site at which the plurality of lighting devices are installed, there is a problem that a lighting setter who installs the lighting devices at the site needs to make the settings of the lighting system, and the time required to make the settings of the lighting system has not yet been reduced.

The present disclosure was made in view of such circumstances, and has an object to provide a lighting system, a terminal, and a method for setting the lighting system which make it possible to make settings of the lighting system easily in short time even when no lighting expert is present at a site.

In order to achieve the above object, a lighting system according to an aspect of the present disclosure is a lighting system including: a plurality of lighting devices; and a terminal which controls the plurality of lighting devices, wherein the terminal includes: a display screen; an input unit configured to receive an instruction from an operator; a communication unit configured to transmit a control command for causing the plurality of lighting devices to perform lighting control; and a controller which (i) obtains, from outside the terminal, setting information including attribute information indicating at least one attribute regarding an installation location of each of the plurality of lighting devices, (ii) associates each of the plurality of lighting devices with any of the at least one attribute indicated by the attribute information included in the obtained setting information according to a dialog with the operator using the display screen and the input unit of the terminal, so as to classify the plurality of lighting devices under groups, and (iii) transmits the control command for each of the obtained groups via the communication unit so as to control the plurality of lighting devices for each of the groups, at least one of the groups including two or more lighting devices.

In addition, in order to achieve the above object, a terminal device according to an aspect of the present disclosure is a terminal device which controls a plurality of lighting devices, wherein the terminal includes: a display screen; an input unit configured to receive an instruction from an operator; a communication unit configured to transmit a control command for causing the plurality of lighting devices to perform lighting control; and a controller which (i) obtains, from outside the terminal, setting information including attribute information indicating at least one attribute regarding an installation location of each of the plurality of lighting devices, (ii) associates each of the plurality of lighting devices with any of the at least one attribute indicated by the attribute information included in the obtained setting information according to a dialog with the operator using a display screen and an input unit of the terminal, so as to classify the plurality of lighting devices under groups, and (iii) transmits the control command for each of the obtained groups via the communication unit so as to control the plurality of lighting devices for each of the groups.

In addition, in order to achieve the above object, a terminal device according to an aspect of the present disclosure is a method for setting a lighting system including a plurality of lighting devices, the method including: generating setting information including attribute information indicating at least one attribute regarding an installation location of each of the plurality of lighting devices, and uploading the generated setting information to a server, the generating and uploading being performed by a lighting designer who designs the lighting system; and downloading the setting information uploaded to the server to a terminal, and associating each of the plurality of lighting devices with any of the at least one attribute indicated by the attribute information included in the obtained setting information according to a dialog with the lighting designer using a display screen and an input unit of the terminal, so as to classify the plurality of lighting devices under groups, the downloading and associating being performed by a lighting setter who arranges the lighting system.

The present disclosure provides the lighting system, the terminal, and the method for setting the lighting system which make it possible to set the lighting system easily in short time even when no lighting expert is present at a site.

BRIEF DESCRIPTION OF DRAWINGS

The figures depict one or more implementations in accordance with the present teaching, by way of examples only, not by way of limitations. In the figures, like reference numerals refer to the same or similar elements.

FIG. 5 is a diagram illustrating display examples of a GUI of the terminal, used by a lighting designer to select a lighting plan and set an attribute of the lighting device as illustrated in FIG. 4;

FIG. 9 is a data structure diagram illustrating another example of setting information stored in a server illustrated in FIG. 2;

DETAILED DESCRIPTION OF THE EMBODIMENT

Hereinafter, an embodiment of the present disclosure is described in detail with reference to the drawings. Each of the exemplary embodiment and variations described below indicates a general or specific example of the present disclosure. The numerical values, shapes, materials, constituent elements, the arrangement positions and connection of the constituent elements, steps, the processing order of the steps etc. indicated in the following exemplary embodiment and variations are mere examples, and therefore do not limit the scope of the present disclosure. In addition, among the constituent elements in the following exemplary embodiment and variations, constituent elements not recited in any one of the independent claims that define the most generic concept of the present disclosure are described as arbitrary constituent elements.

Figure 1:
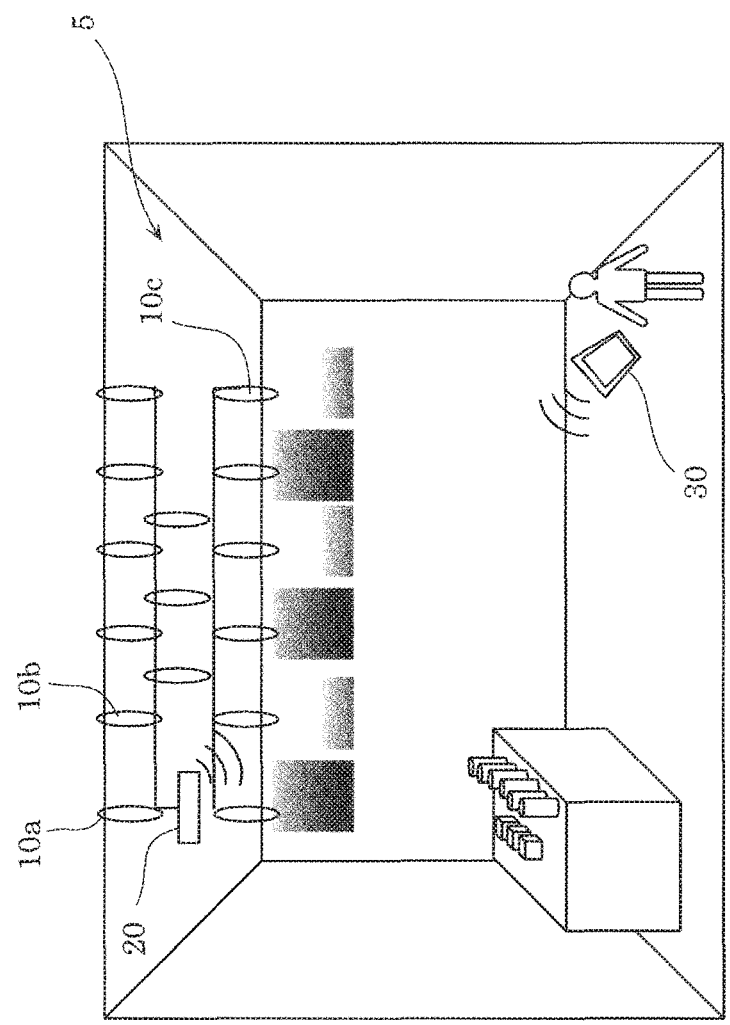
FIG. 1 is a schematic diagram of a lighting system according to an embodiment.

FIG. 1 is a schematic diagram illustrating a main configuration (that is, a configuration in a site) of lighting system 5 according to an embodiment. Lighting system 5 is a system for which settings can be performed easily in short time even when no lighting designer who is a lighting expert is present at a site. Lighting system 5 includes, as main constituent elements, a plurality of lighting devices 10a to 10c, lighting commanding device 20, and terminal 30.

The plurality of lighting devices 10a to 10c are devices which emit light, and are, for example, ceiling lights installed discretely in a room.

Terminal 30 is a terminal for controlling the plurality of lighting devices 10a to 10c by transmitting a control command for lighting control to lighting devices 10a to 10c via lighting commanding device 20. Terminal 30 is, for example, a mobile information terminal such as a tablet terminal, and a smartphone.

Lighting commanding device 20 is a controller which relays the control command from terminal 30 to lighting devices 10a to 10c. Lighting commanding device 20 is, for example, disposed on a ceiling, or included in any of lighting devices 10a to 10c.

Figure 2:
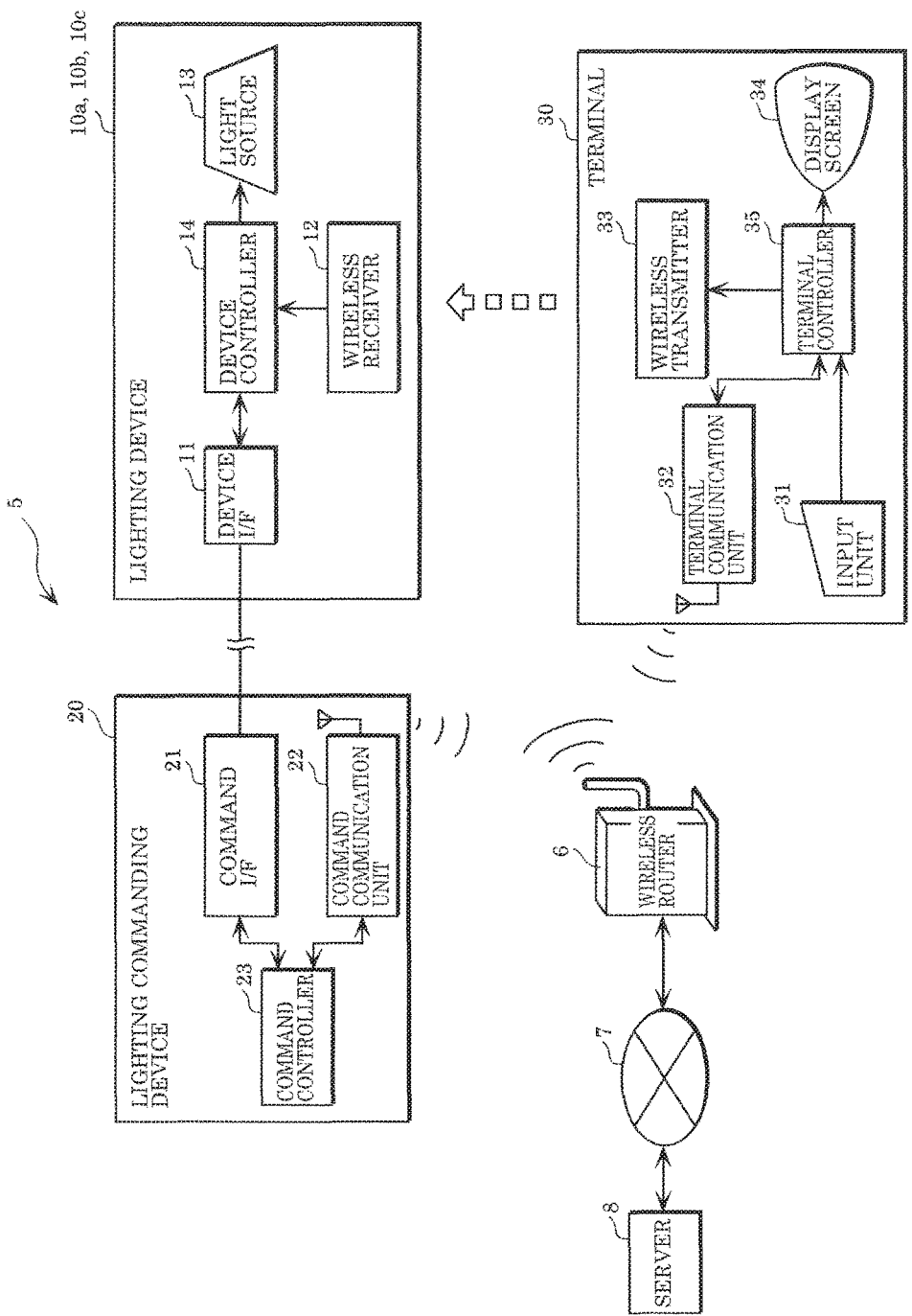
FIG. 2 is a block diagram illustrating configurations of a lighting device, a lighting commanding device, and a terminal which are included in the lighting system illustrated in FIG. 1.

FIG. 2 is a block diagram illustrating configurations of lighting devices 10a to 10c, lighting commanding device 20, and terminal 30 which are included in lighting system 5 illustrated in FIG. 1. Each of the plurality of lighting devices 10a to 10c has the same configuration, and thus it is to be noted that only one of the lighting devices is illustrated in the diagram. The diagram also illustrates, wireless router 6, Internet 7, and server 8 which are incidental constituent elements of lighting system 5.

Each of lighting devices 10a to 10c includes device interface (I/F) 11, wireless receiver 12, light source 13, and device controller 14.

Device I/F 11 is an interface for communicating with lighting commanding device 20 wired or wirelessly (wired in this embodiment). Device I/F 11 is, for example, a serial communication interface, a wireless LAN communication interface, or the like.

Wireless receiver 12 is a receiver which receives a radio signal (an infrared ray signal in this embodiment) which is transmitted from wireless transmitter 33 of terminal 30, and is, for example, an infrared ray receiver.

Light source 13 is a light source which emits light, and is, for example, a light emitting diode (LED).

Device controller 14 is a controller which performs control through communication with device I/F 11, wireless receiver 12, and light source 13. Device controller 14 is, for example, a ROM for storing a control program, a processor for executing a control program, a RAM, a microcomputer (or a micro controller) having various kinds of input and output ports etc, or the like.

More specifically, device controller 14 causes light source 13 to blink for a certain period of time when an infrared ray signal including a logical address is transmitted from terminal 30 and received by wireless receiver 12 in device mapping. Device controller 14 transmits the received logical address and a communication address of the device itself to lighting commanding device 20. It is to be noted that the communication address of each of lighting devices 10a to 10c is assigned and set in advance. The logical address of each of the lighting devices 10a to 10c may be any information for identifying the lighting device. The logical address may be, for example, a sequence of arbitrary characters and/or numerals.

When device controller 14 has received a control command specifying the communication address of the device itself from lighting commanding device 20 via device I/F 11 for lighting control after device mapping, device controller 14 performs turn-on, turn-off, dimming, or color adjustment by controlling light source 13 according to the control command.

Lighting commanding device 20 includes command I/F 21, command communicating unit 22, and command controller 23.

Command I/F 21 is an interface for communicating with lighting devices 10a to 10c wired or wirelessly (wired in this embodiment). Command I/F 21 is, for example, a serial communication interface, a wireless LAN communication interface, or the like.

Command communication unit 22 is an interface which communicates with terminal 30 wirelessly (via wireless router 6 in this embodiment), and is, for example, a wireless LAN interface.

Command controller 23 is a controller which performs control with command I/F 21 and command communication unit 22. Command controller 23 is, for example, a ROM for storing a control program, a processor for executing a control program, a RAM, a microcomputer (or a micro controller) having various kinds of input and output ports etc, or the like.

More specifically, upon receiving the logical address transmitted from lighting devices 10a to 10c and the communication address via command I/F 21, command controller 23 stores the received logical address and the communication address in an associated manner, and performs device mapping. In lighting control, upon receiving the logical address and the control command transmitted from terminal 30 via wireless router 6 and command communication unit 22, command controller 23 identifies the communication address corresponding to the received logical address with reference to the result of the device mapping. Next, command controller 23 controls lighting devices 10a to 10c by transmitting the control command to the lighting device having the identified communication address via command I/F 21.

Wireless router 6 is a device having a function for relaying wireless communication between lighting commanding device 20 and terminal 30 and a function as a gateway which connects terminal 30 and a communication device (server 8 here) on Internet 7.

Server 8 is a communication device on Internet 7, and in this embodiment, is a device for providing setting information of lighting devices 10a to 10c to terminal 30. Here, setting information is information including attribute information indicating at least one attribute regarding an installation location (attachment position in a room) of each of lighting devices 10a to 10c. Setting information is, typically, information including attribute information indicating at least one attribute regarding an installation location of each of lighting devices 10a to 10c in a same room.

Terminal 30 includes input unit 31, terminal communication unit 32, wireless transmitter 33, display screen 34, and terminal controller 35.

Input unit 31 is a device which receives an instruction from an operator, and is, for example, a touch panel, a button, or the like.

Wireless transmitter 33 is a communication interface which transmits a radio signal having a directivity. Wireless transmitter 33 is, for example, a device which transmits visible light or infrared rays as a radio signal (an infrared ray transmitting device mounted onto terminal 30 in a detachable manner in this embodiment). Wireless transmitter 33 transmits a (beam-shaped) radio signal having a directivity, so that the radio signal is directed only to a single lighting device which is a target for device mapping.

Terminal communication unit 32 is a communication interface which wirelessly transmits a control command to at least one (or a group of lighting devices) of lighting devices 10a to 10c by specifying the logical address. Terminal communication unit 32 is, for example, a wireless LAN communication interface.

Display screen 34 is a display which displays various kinds of information for interacting with the operator, and is a liquid crystal display (LCD).

Terminal controller 35 is a controller which performs control through communication with input unit 31, terminal communication unit 32, wireless transmitter 33, and display screen 34. Terminal controller 35 is, for example, a ROM for storing a control program, a processor for executing a control program, a RAM, a microcomputer (or a micro controller) having various kinds of input and output ports etc, or the like. It is to be noted that the control program may be an application program which is downloaded from outside terminal 30.

More specifically, terminal controller 35 obtains setting information corresponding to a site at which lighting devices 10a to 10c are installed, from outside terminal 30. Subsequently, terminal controller 35 associates any one of the at least one attribute indicated by attribute information included in the obtained setting information, with each of lighting devices 10a to 10c according to the dialog with the operator using display screen 34 and input unit 31. In this way, lighting devices 10a to 10c are classified under groups. Setting information may further include the-number-of-devices information indicating the number of lighting devices 10a to 10c having the attribute, for each of the at least one attribute indicated by the attribute information. At this time, terminal controller 35 classifies lighting devices 10a to 10c under groups with reference to the-number-of-devices information included in the setting information.

It is to be noted that terminal controller 35 can reclassify lighting devices 10a to 10c under the groups according to the dialog with the operator using display screen 34 and input unit 31. More specifically, terminal controller 35 displays a plurality of icons classified under the groups. At this time, when an instruction for moving an icon belonging to a group to another one of the groups has been received by input unit 31, terminal controller 35 reclassifies lighting devices 10a to 10c under the groups according to the instruction.

In addition, in the device mapping performed in the group classification, terminal controller 35 displays a plurality of icons (group icons) respectively corresponding to the groups under which lighting devices 10a to 10c was classified. Subsequently, when an instruction for selecting any one of the group icons displayed on display screen 34 has been received by input unit 31, terminal controller 35 causes wireless transmitter 33 to transmit an infrared ray signal indicating a logical address corresponding to the selected group icon.

After the completion of the group classification, terminal controller 35 controls lighting devices 10a to 10c not only for each of the lighting devices but also under the groups by transmitting a control command via terminal communication unit 32 under the groups. Here, the setting information may include operation information in which control of at least one of dimming and color adjustment by lighting devices 10a to 10c is associated with each of at least one attribute indicated by attribute information. Here, "OPERATION INFORMATION" is information indicating control of at least one of dimming and color adjustment. In this case, terminal controller 35 identifies the control of the at least one of dimming and color adjustment associated with the attribute of lighting devices 10a to 10c belonging to a corresponding one of the groups, with reference to the operation information.

Operation information may further include dynamic operation information associated with dynamic control depending on time of a day, for each of the at least one attribute indicated by the attribute information and for the control of at least one of dimming and color adjustment by lighting devices 10a to 10c. Here, "DYNAMIC OPERATION INFORMATION" is information indicating information (schedule) regarding at least one of dimming and color adjustment depending on time of a day. In addition, "DYNAMIC CONTROL" is lighting control depending on time. When setting information include dynamic operation information, terminal controller 35 identifies dynamic control of at least one of dimming and color adjustment associated with an attribute of lighting devices 10a to 10c belonging to a corresponding one of the groups with reference to the dynamic operation information, and performs the identified dynamic control.

In the control of lighting devices 10a to 10c, terminal controller 35 transmits, to lighting commanding device 20, the logical addresses corresponding to the lighting devices (the corresponding one of the groups of lighting devices in this embodiment) which are control targets and the control command. Lighting commanding device 20 converts the received logical addresses to communication addresses, and transmits the control command to the lighting devices each having the converted communication address, so as to control the lighting devices corresponding to the received logical addresses.

Figure 3A:
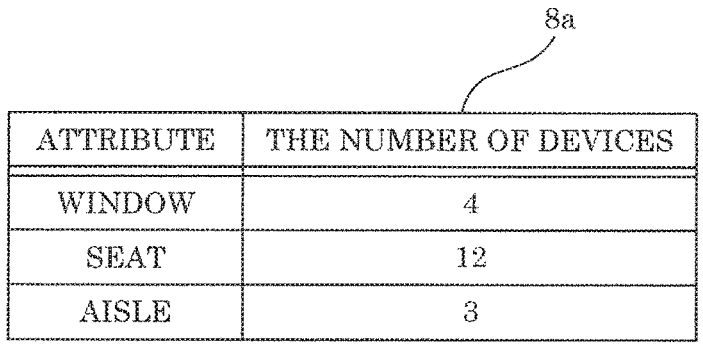
FIG. 3A is a data structure diagram illustrating an example of setting information stored in a server illustrated in FIG. 2.

FIG. 3A is a data structure diagram illustrating an example of setting information 8a stored in server 8 illustrated in FIG. 2. Setting information 8a is information which is typically generated by a lighting designer for each of lighting systems to be disposed at a site. In this example, the "ATTRIBUTE" and "THE NUMBER OF DEVICES" of lighting devices 10a to 10c to be installed at a site are registered in setting information 8a in an associated manner. Here, an "ATTRIBUTE" is information related to an installation location of a lighting device at a site. Examples of attributes include "WINDOW", "SEAT", and "AISLE". In addition, "THE NUMBER OF DEVICES" indicates the number of lighting devices having the corresponding "ATTRIBUTE" and to be installed. Here, it is shown that the number of lighting devices which are installed around a "WINDOW" is four, the number of lighting devices which are installed around a "SEAT" is twelve, and the number of lighting devices which are installed on an "AISLE" is three.

Figure 3B:
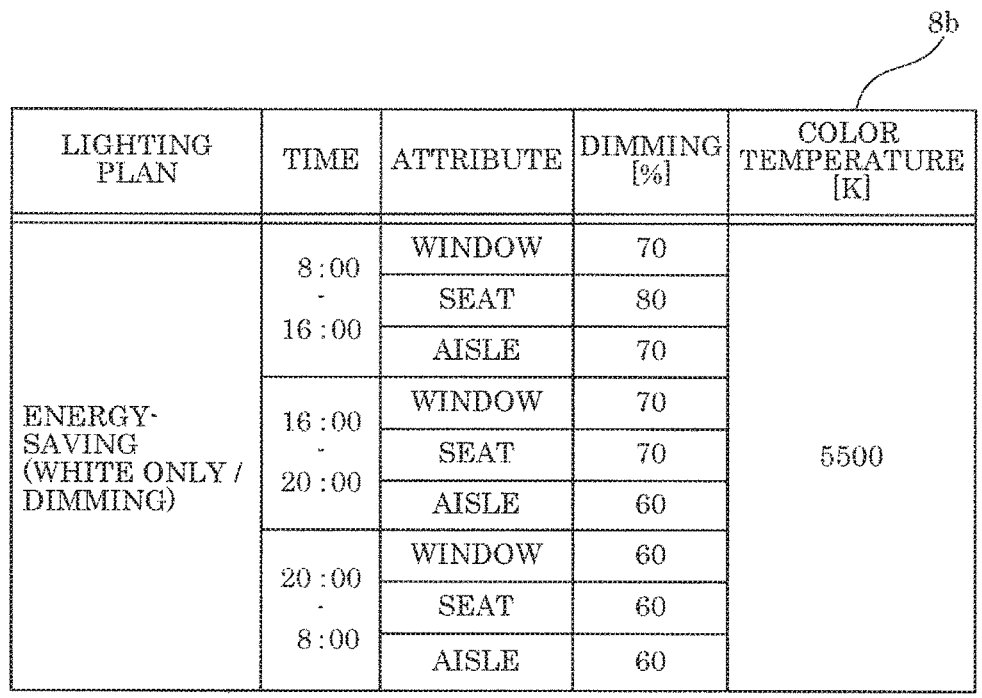
FIG. 3B is a data structure diagram illustrating another example of setting information stored in the server illustrated in FIG. 2.

FIG. 3B is a data structure diagram illustrating an example of setting information 8b stored in server 8 illustrated in FIG. 2. Setting information 8b illustrated in this diagram includes one lighting plan (here, "ENERGY-SAVING (ONLY WHITE LIGHT/DIMMING)". A lighting plan is information in which each of at least one attribute indicated by attribute information and operation information are associated with each other. Here, color adjustment is limited to only white, and a schedule according to time of a day is set for each attribute as dimming.

More specifically, as to a lighting device disposed around the "WINDOW", the following information is indicated: a color temperature is fixed at 5500 K, and dynamic operation information for setting dimming rates to 70% from 8:00 to 16:00, to 70% from 16:00 to 20:00, and to 60% from 20:00 to 8:00. As to a lighting device disposed around the "SEAT", the following information is indicated: a color temperature is fixed at 5500 K, and dynamic operation information for setting dimming rates to 80% from 8:00 to 16:00, to 70% from 16:00 to 20:00, and to 60% from 20:00 to 8:00. As to a lighting device disposed around the "AISLE", the following information is indicated: a color temperature is fixed at 5500 K, and dynamic operation information for setting dimming rates to 70% from 8:00 to 16:00, to 60% from 16:00 to 20:00, and to 60% from 20:00 to 8:00.

Next, descriptions are given of a method for setting lighting system 5 according to this embodiment configured as described above.

Figure 4:
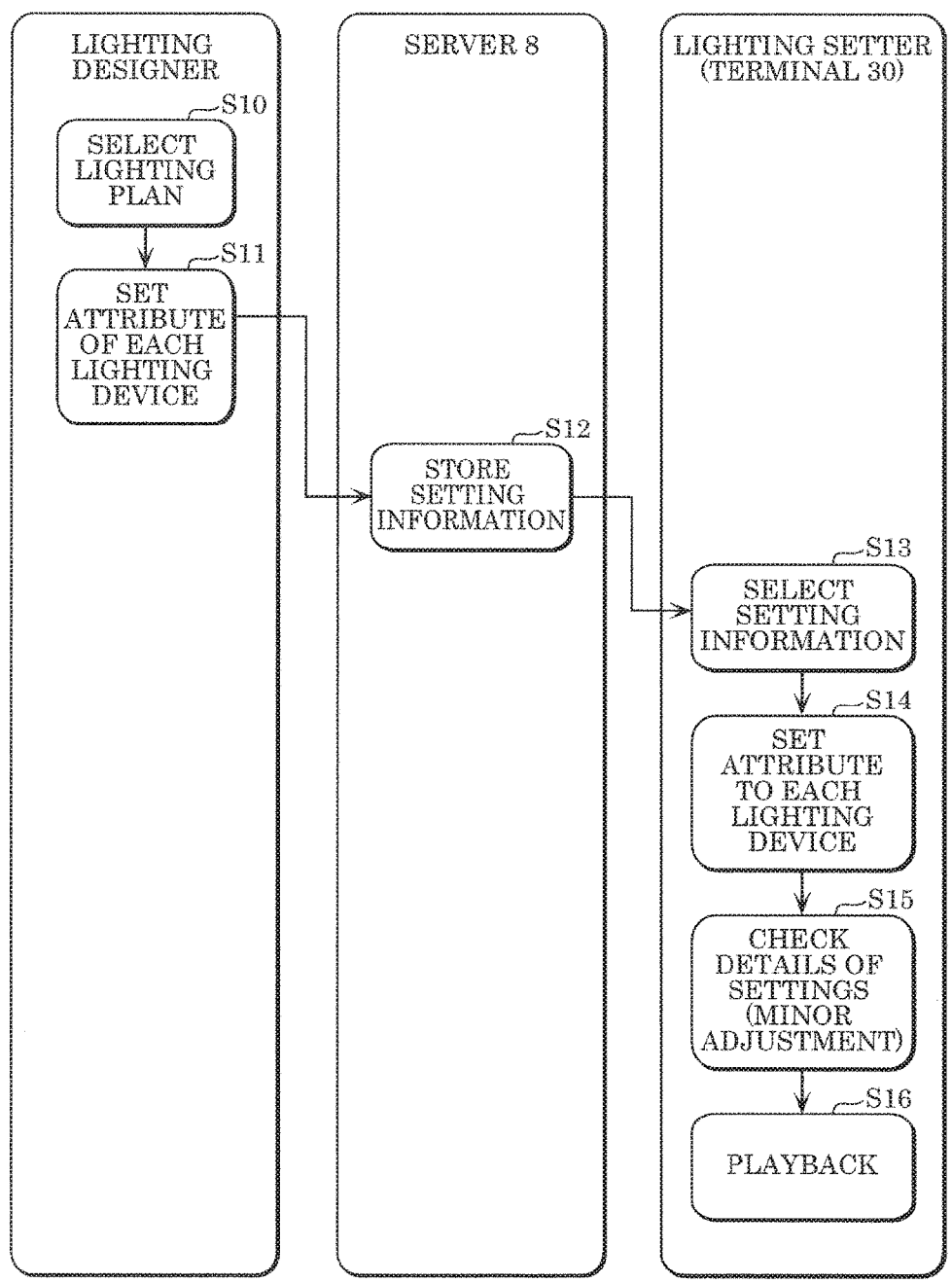
FIG. 4 is a sequence diagram illustrating a method for setting a lighting system according to the embodiment.

FIG. 4 is a sequence diagram illustrating a method for setting lighting system 5 according to the embodiment. FIG. 4 illustrates a flow of operations of a lighting system (lighting system 5 illustrated in FIG. 1) to be disposed at a site. The flow starts with the stage of designing by a lighting designer and ends with a setting operation performed by a lighting setter such as an electrician at a site.

First, lighting designer generates, in advance, setting information using a computer etc. in a designing office or the like different from the site at a stage before lighting system 5 is disposed. More specifically, the lighting designer selects a lighting plan (here, the kind of a lighting plan) (S10). For example, the lighting designer selects "ENERGY-SAVING" as the kind of a lighting plan, with reference to required specifications etc. of lighting system 5 which is the target. It is to be noted that the selection of the kind of a lighting plan is not always an essential procedure. It is to be noted that generating setting information includes not only selecting a lighting plan but also generating a new energy-saving plan.

Next, the lighting designer sets an attribute of each of the lighting devices included in lighting system 5, with reference to a layout diagram at the site and wiring diagram etc. of lighting devices 10a to 10c (S11). For example, the lighting designer determines "WINDOW", "SEAT", and "AISLE" as attributes. At this time, the number of lighting devices for each attribute may be determined by the lighting designer at the same time. Here, determining "WINDOW", "SEAT", and "AISLE" as attributes means naming the lighting devices 10a to 10c.

In this way, when setting information 8a illustrated in FIG. 3A and setting information 8b illustrated in FIG. 3B are generated, the lighting designer uploads the generated setting information from the computer to server 8 via the Internet etc.

In this way, the preparation step is completed by means of the lighting designer who designs lighting system 5 generating setting information including the attribute information indicating the at least one attribute regarding each of the installation locations of lighting devices 10a to 10c, and uploading the generated setting information to server 8. As a result, server 8 stores setting information generated by a lighting expert (lighting designer here) for each of installation constructions of a lighting system (S12).

At the site at which lighting system 5 is disposed, upon completing an attachment construction of lighting system 5, the lighting setter firstly accesses server 8 using terminal 30 and selects setting information corresponding to the site (S13). In this way, setting information generated in advance corresponding to lighting system 5 at the site is downloaded from server 8 to terminal 30.

Next, the lighting setter sets an attribute to each of lighting devices 10a to 10c included in lighting system 5 with reference to the downloaded setting information through a dialog (using a graphical user interface (GUI)) with terminal 30 (S14). In other words, the lighting setter having the dialog with terminal 30 using display screen 34 and input unit 31, and associates each of lighting devices 10a to 10c with a corresponding one of the at least one attribute indicated by the attribute information included in the downloaded setting information. In this way, the lighting devices having the same attribute are set under the same group as an assembly of lighting devices which perform the same lighting control. This is the completion of reclassification of the lighting devices.

It is to be noted that, device mapping is also performed in the classification under the groups in this embodiment. In other words, the logical addresses for identifying the group of lighting devices 10a to 10c which are recognized by terminal 30 are also associated with the communication addresses of lighting devices 10a to 10c installed actually.

Upon the completion of the attribute setting like this (that is, the classification of the lighting devices under the groups), the lighting setter checks the setting details, and performs miner adjustment as necessary (S15). For example, since the plurality of icons corresponding to lighting devices 10a to 10c are displayed under the groups on display screen 34 of terminal 30, the lighting setter moves an icon belonging to one of the groups to another one of the groups. In this way, lighting devices 10a to 10c are reclassified under the groups.

Lastly, the lighting setter checks the setting details by playing back (that is, executing a test of the setting details using a function for simulating (for control of lighting devices as a test) lighting system 5 by terminal 30. For example, with reference to the setting information including dynamic operation information, terminal 30 fast playing back the schedule for a day in one minute, so that dimming and color adjustment control (schedule) for the day for each of lighting devices 10a to 10c can be checked by eyesight in short time.

Hereinafter, main steps in the sequence illustrated in FIG. 4 are described in detail with reference to display screen examples.

FIG. 5 is a diagram illustrating display examples of a GUI of terminal 30, for selection (S10) of a lighting plan by the lighting designer and setting (S11) of an attribute of each lighting device in FIG. 4. In other words, this diagram illustrates the GUI provided by the computer used by the lighting designer to generate the setting information.

As illustrated in the display example on the display screen in (a) of FIG. 5, "PLAN 1" is displayed in lighting plan display area 40 on the display screen as a lighting plan selected by the lighting designer. In other words, at present, the lighting designer is performing an operation for setting the details of "PLAN 1" in the setting information. On the upper right portion of the display screen, "ATTRIBUTE AND THE-NUMBER-OF-DEVICES TABLE 60" is displayed. As "GROUP ATTRIBUTE NAME", three attributes ("WINDOW", "SEAT", and "AISLE") are input by the lighting designer. In device icon display area 50 on the display screen, nineteen device icons taken in from a layout diagram or the like of the site are displayed.

In FIG. 5, (a) illustrates a state where a cursor is placed on "WINDOW" in "ATTRIBUTE AND THE-NUMBER-OF-DEVICES TABLE 60" and three device icons at the uppermost row are selected among nineteen device icons displayed in device icon display area 50. Through this selection, "THE NUMBER OF DEVICES" of lighting devices corresponding to a group attribute "WINDOW" in "ATTRIBUTE AND THE-NUMBER-OF-DEVICES TABLE 60" is automatically counted to be "3".

Subsequently, as illustrated in the display example of the display screen in (b) of FIG. 5, the lighting designer finally selects four device icons in total as the device icons corresponding to the group attribute "WINDOW", and then further selects four device icons as lighting devices corresponding to a group attribute "SEAT". As a result, "THE NUMBER OF DEVICES" of lighting devices corresponding to a group attribute "SEAT" in "ATTRIBUTE AND THE-NUMBER-OF-DEVICES TABLE 60" is automatically counted to be "4".

Through the operations above, as illustrated in the display example of the display screen in (c) of FIG. 5, the lighting designer sets an attribute for each and every device icon, and then presses "END" button 62. In this way, the details set on the display screen are generated as setting information as illustrated in FIG. 3A, and can be printed out or uploaded to server 8.

Figure 6:
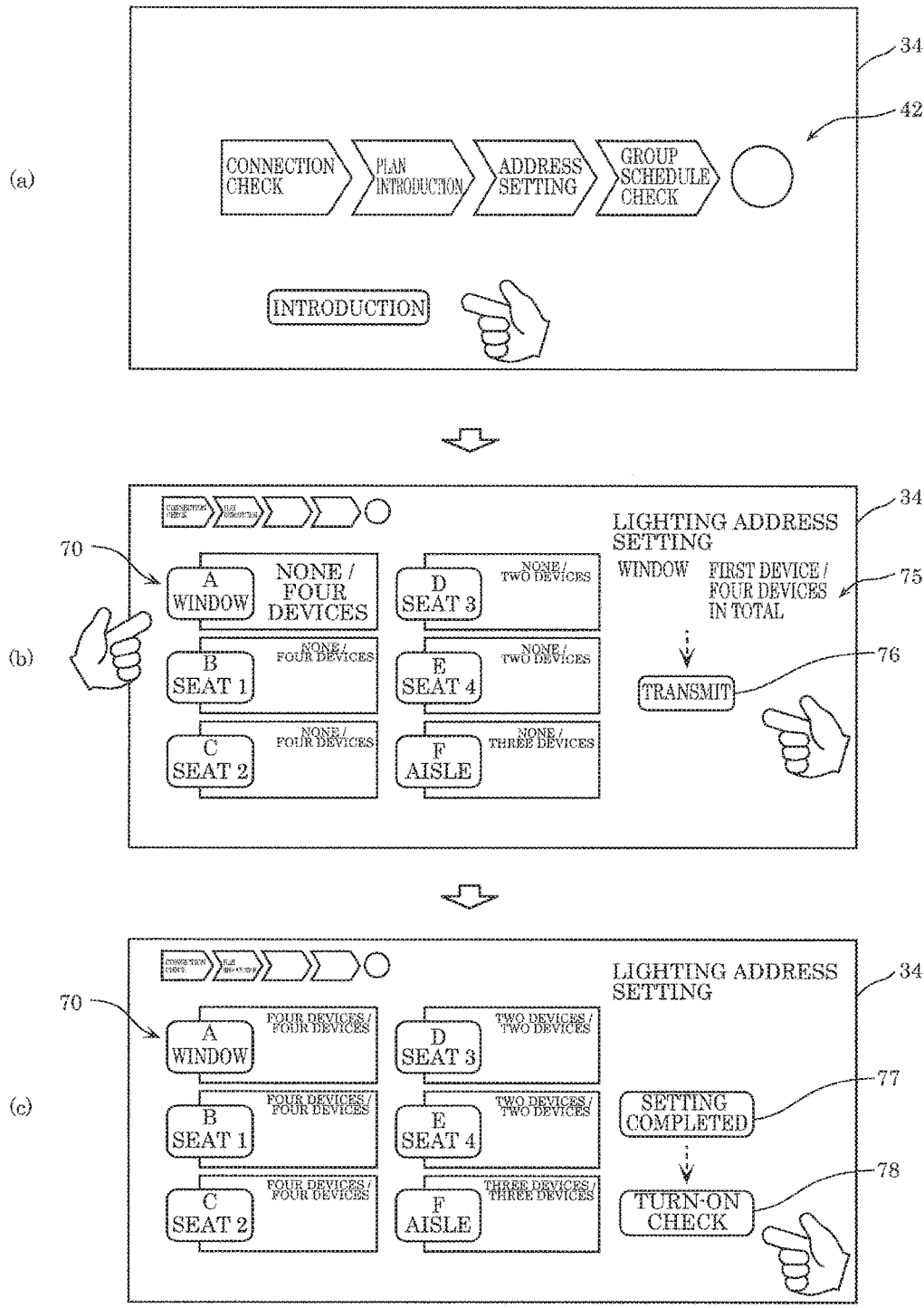
FIG. 6 is a diagram illustrating display examples of the GUI of the terminal, used by a lighting setter to select setting information and set an attribute of the lighting device as illustrated in FIG. 4.

FIG. 6 is a diagram illustrating display examples of the GUI of terminal 30, for selection (S13) of setting information by the lighting setter and setting (S14) of an attribute of each lighting device in FIG. 4. In other words, this diagram illustrates a GUI provided by terminal 30 (more precisely, terminal controller 35), in the classification of lighting devices 10a to 10c under the groups performed by the lighting setter at the site.

Upon completion of the attachment construction of lighting system 5, the lighting setter causes operation menu 42 to be displayed on display screen 34 of terminal 30 as illustrated in the display example on the display screen in (a) of FIG. 6, and touches a "PLAN INTRODUCTION" button for downloading the setting information. In this way, the setting information is downloaded from server 8 to terminal 30 via Internet 7 and wireless router 6. It is to be noted that, in operation menu 42 illustrated in (a) of FIG. 6, "CONNECTION CHECK" is an example of an operation performed when the lighting device performs wired communication.

When the lighting device performs wireless communication, the above operation is changed to, for example, an operation called "PAIRING". In addition, the order of operations of "PAIRING" and "ADDRESS SETTING" is arbitrarily changeable.

When the download of the setting information has completed, display screen 34 transits to a state illustrated in the display example of the display screen in (b) of FIG. 6. Here, group icons each having a group attribute name using a corresponding one of the attributes ("WINDOW", "SEAT", and "AISLE" here) included in the downloaded setting information are displayed in group display area 70 of display screen 34. It is to be noted that "A WINDOW", "B SEAT 1", "C SEAT 2", "D SEAT 3", "E SEAT 4", or "F AISLE" is displayed to each of the group icons as a group name in group display area 70. Each group name may be automatically assigned with reference to the group name included in the setting information, or may be input by the lighting setter. In addition, an attribute that should be set at this time ("WINDOW" here) and the number of devices having the attribute are displayed in attribute and the-number-of-devices display area 75 displayed at the right part of display screen 34, based on the attribute information included in the downloaded setting information.

In the display example of the display screen in (b) of FIG. 6, a group icon (the icon of a group having an attribute of "WINDOW") positioned at the upper left part of group display area 70 of display screen 34 is selected. In this state, the lighting setter directs wireless transmitter 33 of terminal 30 sequentially to respective lighting devices 10*a* to 10*c* which are desired to be targets of the "WINDOW" group, and presses "TRANSMIT" button 76 displayed on display screen 34. Then, an infrared ray signal including the logical address for identifying a current lighting device in the selected group is output from wireless transmitter 33 of terminal device 30. The lighting device which received the infrared ray signal blinks for a certain period of time. In this way, the light setter can check by eyesight that the intended lighting device has successfully been specified. In addition, the number of lighting devices (here, "FIRST DEVICE/ FOUR DEVICES IN TOTAL") having an attribute of "WINDOW" at that time is displayed in attribute and the-number-of-devices display area 75 on display screen 34. It is to be noted that the lighting device which has received the infrared ray signal transmits the logical address included in the infrared ray signal and the communication address of the device itself to lighting commanding device 20 through the operation by "TRANSMIT" button 76. Lighting commanding device 20 performs device mapping by storing the logical address transmitted from the lighting device and the communication address in an associated manner.

When the classification of lighting devices 10*a* to 10*c* under the groups was completed by repeating the operations like these for all of the groups, "SETTING COMPLETED" message 77 is displayed on display screen 34 as illustrated in the display example of the display screen in (c) of FIG. 6. In this way, the classification of lighting devices 10*a* to 10*c* under the groups including the device mapping at the site was completed. The setting details is stored in terminal 30, so that lighting control of lighting devices 10*a* to 10*c* can be performed by terminal 30.

It is to be noted that the lighting setter can check the classification of lighting devices 10*a* to 10*c* under the groups completed just now by pressing "TURN-ON CHECK" button 78 displayed on display screen 34. When "TURN-ON CHECK" button 78 is pressed, terminal 30 transmits a control command for sequentially causing respective lighting devices 10*a* to 10*c* in each and every group at certain time intervals. The lighting setter can check by eyesight whether or not the classification has been successfully completed by executing such a test.

Figure 7:
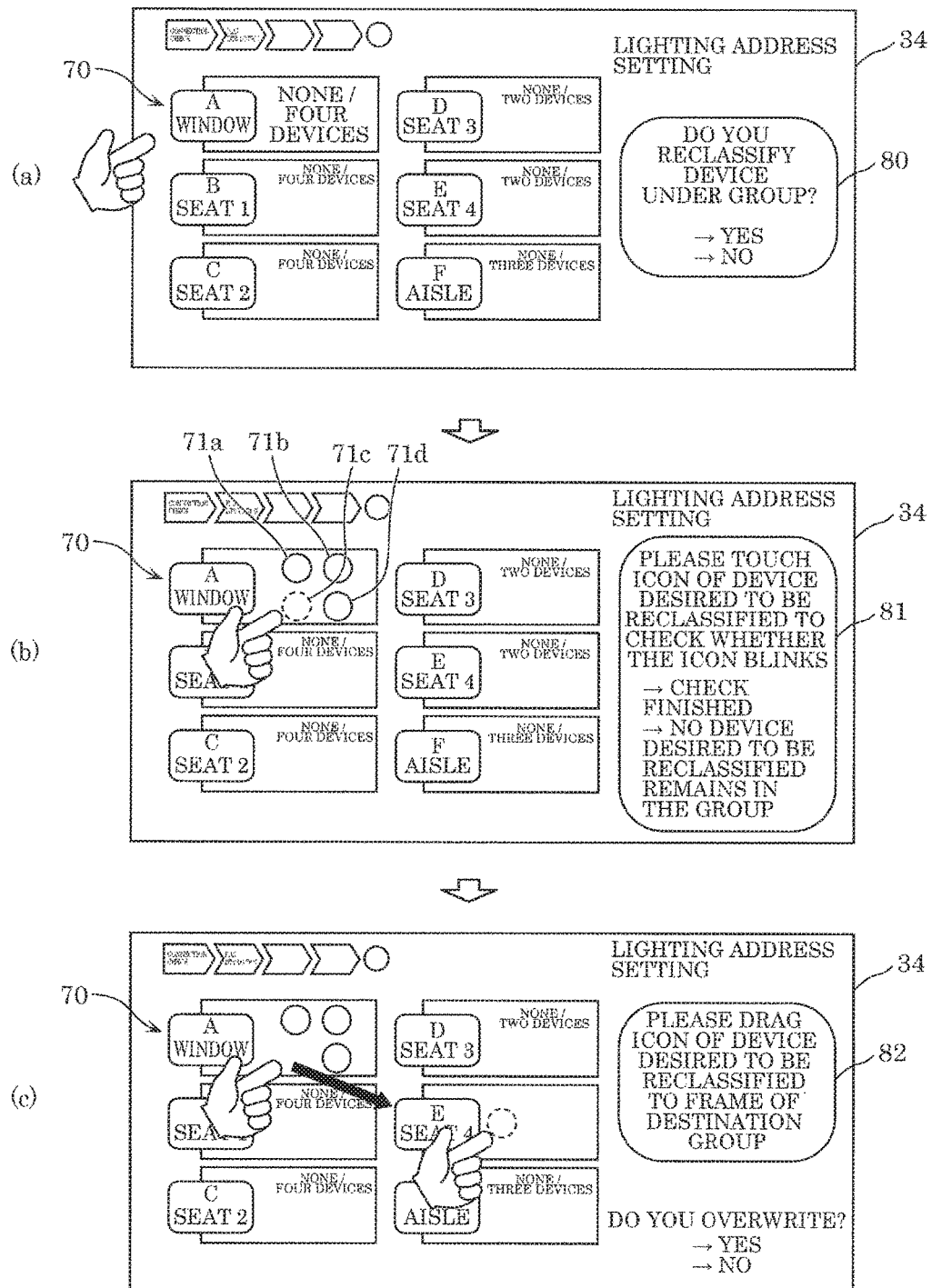
FIG. 7 is a diagram illustrating display examples of the GUI of the terminal, used by the lighting setter when reclassifying groups in selecting an attribute of a lighting device and checking the details of the setting as illustrated in FIG. 4.

FIG. 7 is a diagram illustrating display examples of the GUI at the time of reclassifying two of the groups in setting (S14) the attribute of a lighting device by the lighting setter and checking (S15) the details of the setting in FIG. 4. In other words, this diagram illustrates a GUI provided by terminal 30 (more precisely, terminal controller 35), at the time of reclassifying two of the groups of lighting devices 10*a* to 10*c* performed by the lighting setter at the site.

As illustrated in the display example of the display screen in (a) of FIG. 7, when the group icon corresponding to a group including a device desired to be reclassified is selected in group display area 70 on display screen 34, message 80 of "DO YOU RECLASSIFY DEVICE UNDER GROUP?" is displayed in a pop-up manner. When a display area of "YES" is touched, the frame of the selected group icon blinks to create a state in which the lighting devices in the group within the frame can be reclassified, as illustrated in the display example of the display screen in (b) of FIG. 7.

In the display example of the display screen in (b) of FIG. 7, four device icons 71*a* to 71*d* corresponding to the lighting devices included in the selected group icon are displayed. The four device icons 71*a* to 71*d* are icons for checking the corresponding lighting devices. When one of device icons 71*a* to 71*d* is touched, a control command for causing the lighting device corresponding to the touched device icon to blink is transmitted to the lighting device. Thus, the lighting setter can select the device icons of the lighting devices desired to be reclassified while checking the blinking states of the lighting devices by sequentially touching four device icons 71*a* to 71*d* according to message 81 displayed on display screen 34.

As illustrated in the display example of the display screen in (c) of FIG. 7, the lighting setter drags device icon 71*c* of the lighting device desired to be reclassified under a group to move it to a group icon of the destination group under which the lighting device corresponding to device icon 71*c* is reclassified, according to message 82 displayed on display screen 34. In this way, the group (the logical address of the associated group) before the reclassification of the lighting device desired to be reclassified is changed to the destination group after the reclassification. Accompanied by this, display of the number of devices in the destination group after the reclassification and display of the number of devices in the group before the reclassification are also changed.

In this way, in terminal 30, terminal controller 35 displays a plurality of icons corresponding to lighting devices 10*a* to 10*c* on display screen 34 under the groups. When an instruction for moving an icon belonging to one of the groups to another one of the groups was received by input unit 31, terminal controller 35 reclassifies lighting devices 10*a* to 10*c* under a group according to the instruction.

Figure 8:
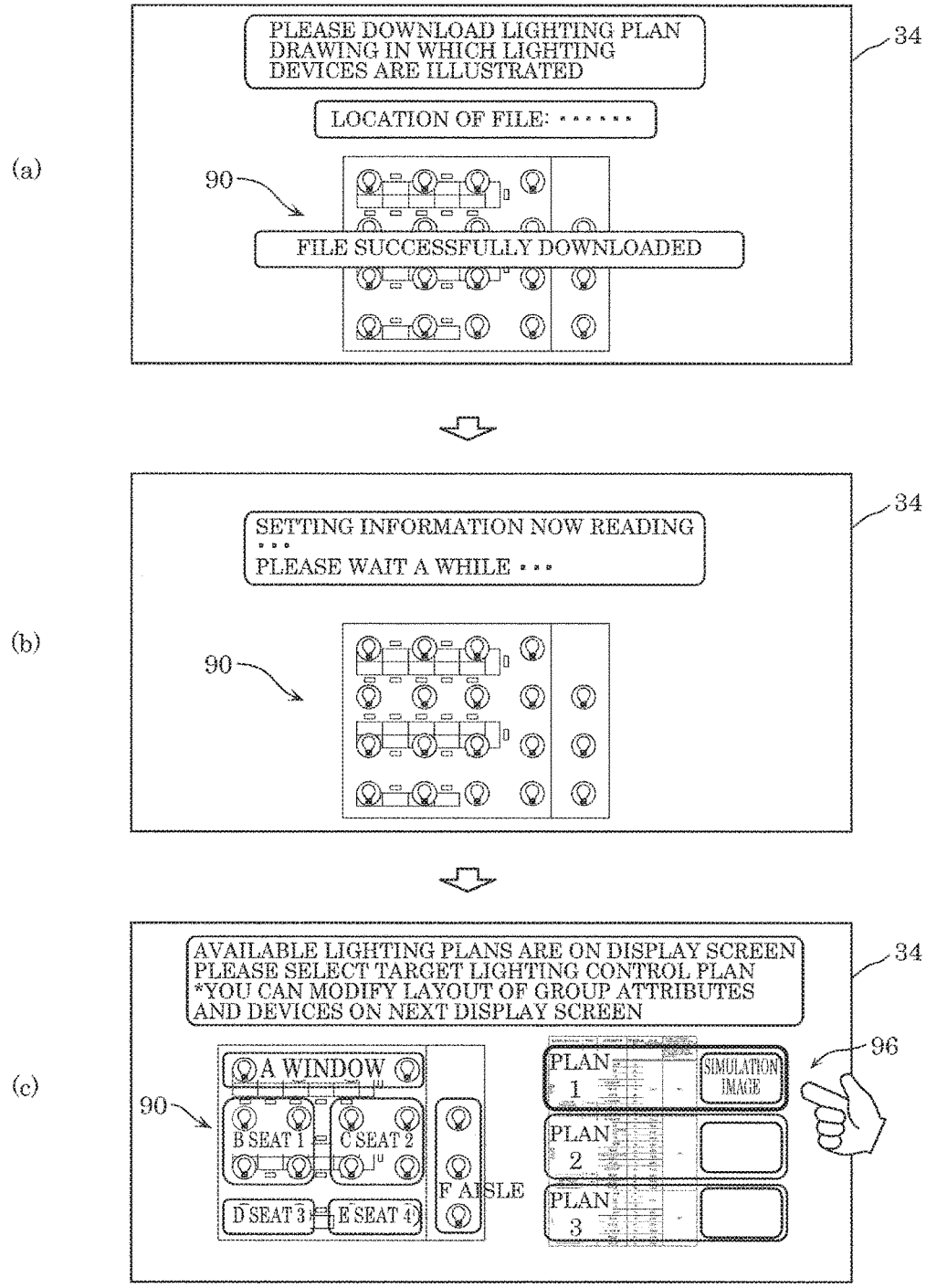
FIG. 8 is a diagram illustrating display examples of the GUI of the terminal, used by the lighting setter to select a lighting plan in selecting setting information and setting an attribute of a lighting device as illustrated in FIG. 4.

FIG. 8 is a diagram illustrating examples of a GUI of terminal 30, for selection (S13) of setting information by the lighting setter and setting (S14) of an attribute of each lighting device in FIG. 4. In other words, this diagram illustrates a GUI provided by terminal 30 (more precisely, terminal controller 35), in the selection of a lighting plan for lighting devices 10*a* to 10*c* performed by the lighting setter at the site.

As illustrated in the display example of the display screen in (a) of FIG. 8, in this example, a lighting plan diagram stored in server 8 is firstly downloaded by the lighting setter. Here, the "LIGHTING PLAN DIAGRAM" is a diagram indicating a layout (that is, the arrangement positions and the number of devices) of lighting devices 10a to 10c at the site, and is created in advance by the lighting designer, and is uploaded to server 8. By downloading the lighting plan diagram, nineteen device icons corresponding to lighting devices 10a to 10c are displayed in device icon display area 90 of display screen 34 of terminal 30 such that the device icons are superimposed on the layout at the site as illustrated in (a) of FIG. 8.

Completion of the download of the lighting plan diagram starts download of the setting information associated with the lighting plan diagram from server 8, and a message indicating that the setting information is being downloaded is displayed as illustrated in the display example of the display screen in (b) of FIG. 8. FIG. 9 is a data structure diagram indicating an example of setting information 8c to be downloaded. Likewise the setting information illustrated in FIG. 3A and FIG. 3B, setting information 8c is also data created in advance by the lighting designer and uploaded to server 8. Setting information 8c includes three lighting plans ("ENERGY-SAVING (ONLY WHITE/DIMMING)", "ENERGY-SAVING (WHITE AND WARM WHITE/DIMMING)", "HEALTHY (DIMMING AND COLOR ADJUSTMENT FOR CIRCADIAN RHYTHM ADJUSTMENT)").

When setting information 8c including the three lighting plans as illustrated in FIG. 9 is downloaded to terminal 30, display screen 34 transits to a display state illustrated in the display example of the display screen in (c) of FIG. 8. In other words, lighting plan selection menu 96 for selecting the three lighting plans included in setting information 8c is displayed in the right part area of display screen 34. It is to be noted that "PLAN 1", "PLAN 2", and "PLAN 3" displayed on lighting plan selection menu 96 respectively correspond to the following three lighting plans in setting information 8c: "ENERGY-SAVING (ONLY WHITE/DIMMING)", "ENERGY-SAVING (WHITE AND WARM WHITE/DIMMING)", "HEALTHY (DIMMING AND COLOR ADJUSTMENT FOR CIRCADIAN RHYTHM ADJUSTMENT)". Thus, the lighting setter can complete the association between each of the groups of lighting devices and operation information by selecting one of the three lighting plans.

It is to be noted that, in the display example of the display screen in (c) of FIG. 8, six groups are displayed in device icon display area 90. The classification under the groups and the attribute and device mapping for each group are set through the GUI illustrated in FIG. 6.

In this way, in the display example of the display screen in FIG. 8, the setting information includes the plurality of lighting plans in which each of the at least one attribute and the operation information are associated with each other. Thus, terminal controller 35 of terminal 30 can control lighting devices 10a to 10c under the groups, according to one of the plurality of lighting plans which has been selected through a dialog with the operator using display screen 34 and input unit 31.

As described above, lighting system 5 according to this embodiment is a system including the plurality of lighting devices 10a to 10c and terminal 30 which controls lighting devices 10a to 10c. Terminal 30 includes: display screen 34; input unit 31 which receives an instruction from the operator; terminal communication unit 32 which transmits a control command for causing lighting devices 10a to 10c to perform lighting control; and terminal controller 35. Terminal controller 35 obtains, from outside terminal 30, the setting information including the attribute information indicating the at least one attribute regarding the installation location of each of lighting devices 10a to 10c. Subsequently, terminal controller 35 associates any one of the at least one attribute indicated by the attribute information included in the obtained setting information, with each of lighting devices 10a to 10c according to the dialog with the operator using display screen 34 and input unit 31. Furthermore, terminal controller 35 controls lighting devices 10a to 10c under the groups by transmitting a control command under the obtained groups via terminal communication unit 32.

In this way, terminal 30 obtains the setting information for setting lighting system 5 from outside terminal 30, and classifies lighting devices 10a to 10c under the groups with reference to the obtained setting information. The setting information includes the attribute information indicating the at least one attribute regarding the installation location of each of lighting devices 10a to 10c, and can be generated in advance by the lighting designer who is a lighting expert. Thus, it is unnecessary that a lighting expert be present at the site at which lighting devices 10a to 10c are installed. Furthermore, lighting devices 10a to 10c can be easily classified under the groups through the user interface using input unit 31 and display screen 34 with reference to the setting information at the site. In other words, even when no lighting expert is present at the site, it is possible to perform settings for lighting system 5 easily in short time.

Setting information may further include the-number-of-devices information indicating the number of lighting devices 10a to 10c having the attribute, for each of the at least one attribute. At this time, terminal controller 35 classifies lighting devices 10a to 10c under the groups with reference to the-number-of-devices information included in the setting information.

In this way, the setting information includes the number of lighting devices determined by the lighting designer or the like for each of the attributes of lighting devices 10a to 10c. Thus, at the site, terminal 30 classifies lighting devices 10a to 10c under the groups easily and appropriately with reference to the number of lighting devices for each attribute of lighting devices 10a to 10c.

In addition, the setting information may further include operation information in which each of the at least one attribute indicated by the attribute information is associated with the control of the at least one of dimming and color adjustment by lighting devices 10a to 10c. Terminal controller 35 identifies the control of the at least one of dimming and color adjustment associated with the attribute of lighting devices 10a to 10c belonging to a corresponding one of the groups, with reference to the operation information, and performs the identified control.

In this way, the setting information includes the operation information of lighting devices 10a to 10c, determined by the lighting designer etc. for each of the attributes of lighting devices 10a to 10c. Thus, at the site, terminal 30 sets a scene easily and appropriately for the group of lighting devices 10a to 10c having the attribute assigned thereto, with reference to the operation information.

In addition, the operation information may further include dynamic operation information associated with dynamic control depending on time of a day, for each of the at least one attribute indicated by the attribute information and for the control of at least one of dimming and color adjustment by lighting devices 10a to 10c. Terminal controller 35 identifies dynamic control of at least one of dimming and color adjustment associated with the attribute of lighting devices 10a to 10c belonging to a corresponding one of the groups with reference to the dynamic operation information, and performs the identified dynamic control.

In this way, the setting information includes the dynamic operation information of lighting devices 10a to 10c, determined by the lighting designer for each of the attributes of lighting devices 10a to 10c. Thus, at the site, terminal 30 sets a schedule easily and appropriately for the group of lighting devices 10a to 10c having the attribute assigned thereto, with reference to the dynamic operation information.

In addition, the setting information includes the plurality of lighting plans in which each of the at least one attribute and the operation information are associated with each other. Thus, terminal controller 35 controls lighting devices 10a to 10c under the groups, according to one of the plurality of lighting plans which has been selected through a dialog with the operator using display screen 34 and input unit 31.

In this way, the setting information may include the lighting plan in which each of the attributes of lighting devices 10a to 10c and the operation information are associated with each other, determined by the lighting designer. Thus, at the site, terminal 30 automatically determines the scene for each of the groups of lighting devices 10a to 10c having the attribute assigned thereto, by selecting the lighting plan, and sets the scene for each group easily and appropriately.

In addition, terminal controller 35 further displays, on display screen 34, a plurality of icons corresponding to lighting devices 10a to 10c under the groups. When an instruction for moving an icon belonging to one of the groups to another one of the groups was received by input unit 31, terminal controller reclassifies lighting devices 10a to 10c under a group according to the instruction.

In this way, it is possible to reclassify lighting devices 10a to 10c under a group using the GUI, and thus it is possible to easily reclassify lighting devices 10a to 10c under a group according to circumstances at the site.

In addition, the method for setting lighting system 5 according to this embodiment is a method for setting lighting system 5 including the plurality of lighting devices 10a to 10c, and includes the steps below. One of the steps is a step in which the lighting designer who designs lighting system 5 generates setting information including attribute information indicating at least one attribute regarding the installation location of each of lighting devices 10a to 10c, and uploading the generated setting information to server 8. The other one of the steps is as follows. The lighting setter who disposes lighting system downloads the setting information uploaded to server 8 to terminal 30. Subsequently, terminal 30 associates any one of the at least one attribute indicated by attribute information included in the obtained setting information, with each of lighting devices 10a to 10c according to the dialog with the operator using display screen 34 and input unit 31 of terminal 30. Based on the association, lighting devices 10a to 10c are classified under groups.

In this way, terminal 30 obtains the setting information for setting lighting system 5 from outside terminal 30, and classifies lighting devices 10a to 10c under the groups with reference to the obtained setting information. The setting information includes the attribute information indicating the at least one attribute regarding the installation location of each of lighting devices 10a to 10c, and can be generated in advance by the lighting designer who is a lighting expert. Thus, it is unnecessary that a lighting expert be present at the site at which lighting devices 10a to 10c are installed. Furthermore, lighting devices 10a to 10c can be easily classified under the groups through the user interface using input unit 31 and display screen 34 with reference to the setting information at the site. In other words, even when no lighting expert is present at the site, it is possible to perform settings for lighting system 5 easily in short time.

The lighting system, the terminal, and the method for setting the lighting system according to the present disclosure have been described based on the embodiment and variations above, but the present disclosure is not limited to the embodiment and variations. The present disclosure covers and encompasses embodiments that a person skilled in the art may arrive at by adding various kinds of modifications to the above embodiment or by arbitrarily combining some of the constituent elements in the embodiment within the scope of the present disclosure.

For example, in this embodiment, through the GUI for setting (S14) the attribute of each lighting device on display screen 34 of terminal 30, one of the groups in group display area 70 is selected, and then specific lighting devices which are associated with the group is selected using an infrared ray signal. However, the way of setting attributes of the lighting devices is not limited to the procedure. It is also good to select specific lighting devices using an infrared ray signal, and then specify the group to which the lighting devices belong.

Figure 10:
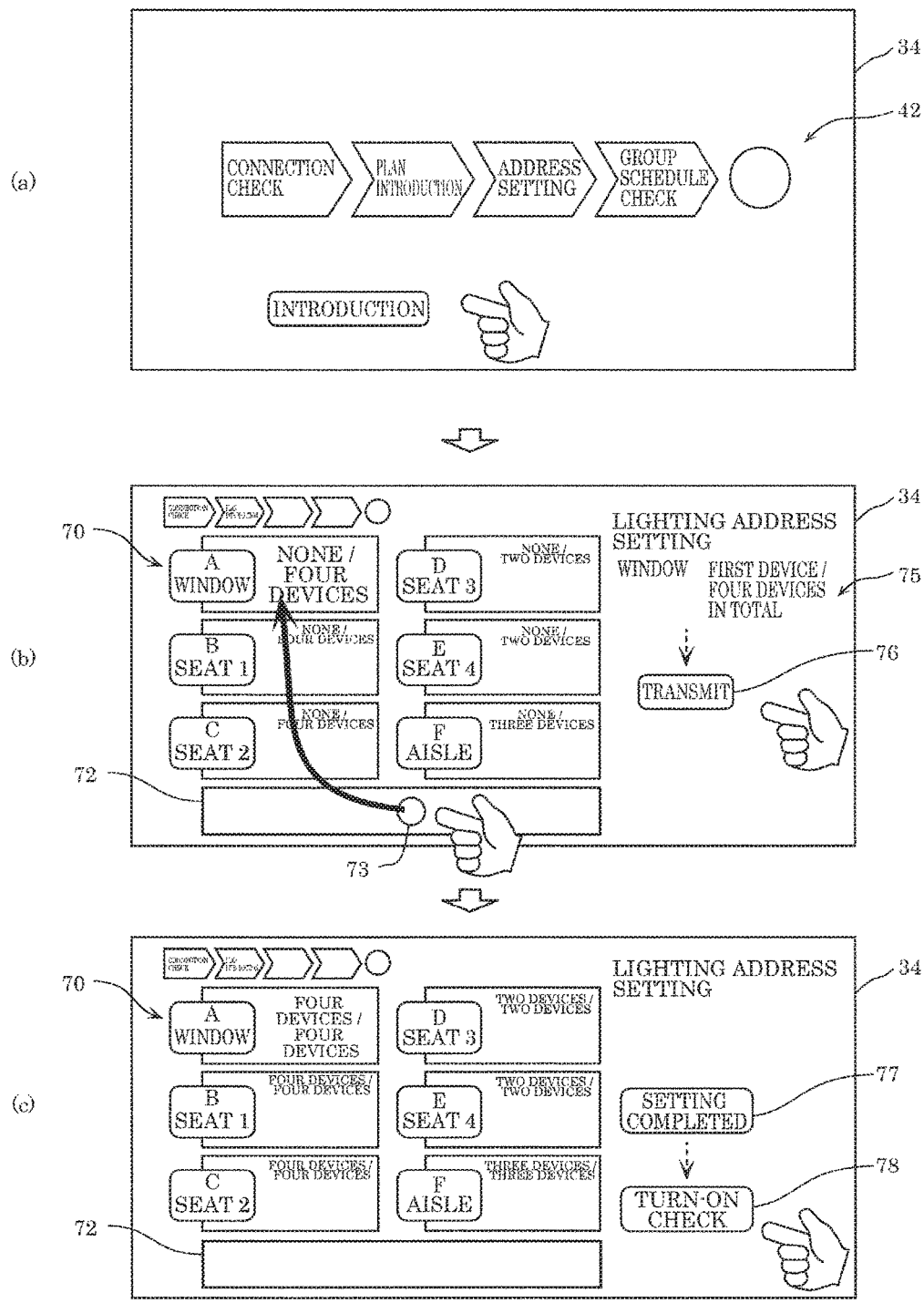
FIG. 10 is a diagram illustrating display examples of the GUI of the terminal, used by the lighting setter to select setting information and set an attribute of a lighting device according to a variation of the embodiment.

FIG. 10 is a diagram illustrating an example of the GUI of terminal 30 for selection (S13) of setting information by the lighting setter and for setting (S14) of the attribute of each lighting device according to a variation of this embodiment, and corresponds to a variation of the GUI illustrated in FIG. 6. Here, a procedure for firstly selecting specific lighting devices using an infrared ray signal and then specifying the group to which the lighting devices belong is illustrated as the setting (S14) of the attribute of the lighting devices.

As illustrated in the display example of the display screen in (a) of FIG. 10, setting information is downloaded using operation menu 42 displayed on display screen 34 of terminal 30. When the download is completed, device icon display area 72 is displayed below group display area 70, as illustrated in the display example of the display screen (in a state where no device icon 73 is displayed) in (b) of FIG. 10.

In this state, the lighting setter directs wireless transmitter 33 of terminal 30 toward a lighting device for which an attribute is to be set, and presses "TRANSMIT" button 76 displayed on display screen 34. With the press, an infrared ray signal is output from wireless transmitter 33 of terminal 30. Upon receiving the infrared ray signal, the lighting device blinks for a certain period of time, and transmits the communication address of the device itself to terminal 30 via lighting commanding device 20. Upon receiving the communication address, terminal 30 displays device icon 73 corresponding to the received communication address in device icon display area 72 ((b) of FIG. 10). The lighting setter drags device icon 73 displayed in device icon display area 72 to a group icon including the lighting device having an attribute desired to be assigned ((b) in FIG. 10).

When the classification under the groups is completed by repeating the operations like these for all of the groups, "SETTING COMPLETED" message 77 is displayed on display screen 34 as illustrated in the display example of the display screen in (c) of FIG. 10. It is to be noted that the lighting setter can check the classification under the groups completed just now by pressing "LIGHTING CHECK" button 78 displayed on display screen 34.

Although the lighting devices are reclassified under the groups by dragging the device icons in the above embodiment, it is to be noted that the way of reclassification is not limited to the method, and it is also good to collectively reclassify the lighting devices by selecting the group before the reclassification and the group after the reclassification.

Figure 11:
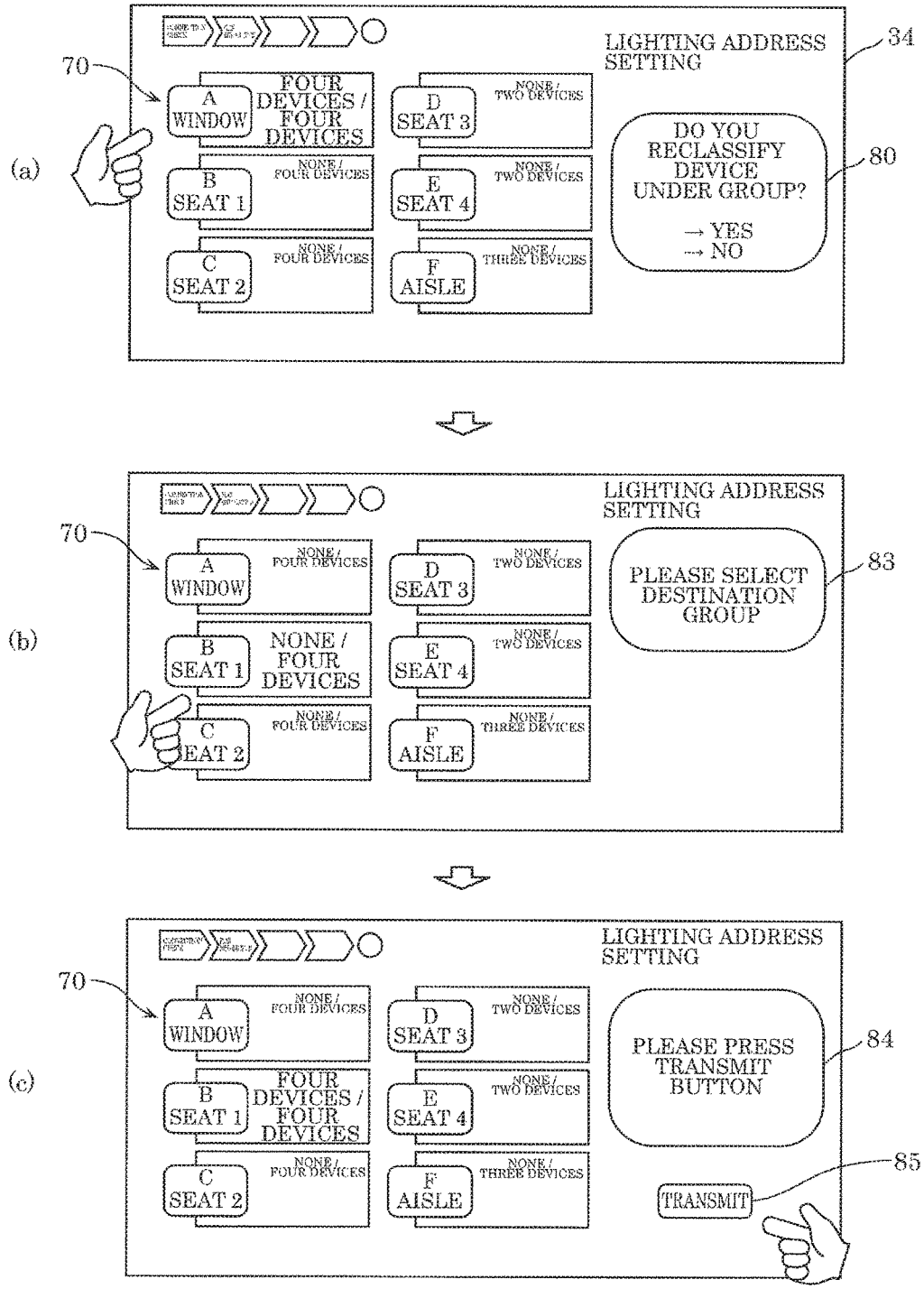
FIG. 11 is a diagram illustrating display examples of the GUI of the terminal, used for collectively reclassifying the lighting devices belonging to one of groups under another one of the groups.

FIG. 11 is a diagram illustrating display examples of the GUI of terminal 30, for collectively reclassifying the lighting devices belonging to the one of the groups under the other one of the groups, according to a variation of the embodiment. This variation corresponds to the variation of the GUI illustrated in FIG. 7.

Here, (a) of FIG. 11 is almost the same as (a) of FIG. 7. As illustrated in the display example of the display screen in (a) of FIG. 10, when the group icon before reclassification is selected in group display area 70 on display screen 34, message 80 of "DO YOU RECLASSIFY DEVICE UNDER GROUP?" is displayed on display screen 34 in a pop-up manner. When touching a display area of "YES" in response, in this variation, as illustrated in the display example of the display screen in (b) of FIG. 11, message 83 of "PLEASE SELECT DESTINATION GROUP" is displayed on display screen 34 in a pop-up manner, which allows selection of the destination group under which the device is reclassified.

The lighting setter selects the group icon of the destination group, according to message 83 displayed on display screen 34. With the selection, message 84 of "PLEASE PRESS TRANSMIT BUTTON" and "TRANSMIT" button 85 are displayed on display screen 34 in a pop-up manner as illustrated in the display example of the display screen in (c) of FIG. 11. Thus, the lighting setter presses "TRANSMIT" button 85. In this way, the group and attribute of the lighting device which belonged to the group before the reclassification are changed correspondingly to those in the group after the reclassification, and display of the numbers of devices in the respective groups before and after the reclassification are also changed.

In this way, terminal controller 35 of terminal 30 displays a plurality of icons corresponding to lighting devices 10a to 10c on display screen 34 under the groups. When an instruction for collectively moving the lighting devices belonging to the one of the groups to the other one of the groups was received by input unit 31, terminal controller 35 collectively reclassifies lighting devices 10a to 10c according to the instruction under the group.

In this embodiment and each variation, each of setting information 8a, 8b, and 8c includes not only attribute information but also the the-number-of-devices information, the operation information, or the dynamic operation information. However, the the-number-of-devices information, the operation information, or the dynamic operation information are not always necessary. This is because, when setting information includes at least the attribute information, it is possible to obtain information regarding the installation locations of respective lighting devices 10a to 10c therefrom, and to identify the assembly (group) of lighting devices which are the targets for the same lighting control.

Although lighting system 5 in the embodiment and each variation includes lighting commanding device 20, lighting commanding device 20 is not always necessary. Terminal 30 may communicate with each of lighting devices 10a to 10c directly through wireless communication, etc. or via wireless router 6, and to thereby storing information for device mapping and directly control lighting devices 10a to 10c with reference to the information.

The functions of terminal controller 35 of terminal 30 in the embodiment and each variation may be implemented by a program such as an application which is executed by a processor. The program may be circulated by being stored onto a recording medium such as a computer-readable CD-ROM or the like, or by being distributed through a communication network such as the Internet.

While the foregoing has described one embodiment and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:
1. A lighting system, comprising:
a plurality of lighting devices; and
a terminal which controls the plurality of lighting devices, and is configured to access a server device via a communication network,
wherein the server device stores, for installation of a plurality of lighting systems including the lighting system, a plurality of pieces of setting information related to the installation of the plurality of lighting systems, respectively,
before the installation of the plurality of lighting systems is performed, the plurality of pieces of setting information for the installation of the plurality of lighting systems:
are generated each to include pairs of (i) attribute information which indicates at least one attribute of an installation location of corresponding one or more of a plurality of lighting devices and (ii) number-of-devices information indicating the number of the corresponding one or more of the plurality of lighting devices installed at the installation location; and
are uploaded by a computer device via the communication network, and wherein the terminal includes:
a display screen;
an input unit configured to receive an instruction from an operator;
a communication unit configured to transmit a control command for causing the plurality of lighting devices to perform lighting control; and
a controller which (i) selects, after installation of the lighting system is completed, setting information related to completed installation of the lighting system among the plurality of pieces of setting information stored in the server device, based on the instruction received by the input unit, (ii) downloads the setting information related to the completed installation from the server device via the communication network to obtain the setting information related to the completed installation, (iii) associates each of the plurality of lighting devices of the lighting system with any of the at least one attribute indicated by the attribute information included in the obtained setting information according to a dialog with the operator using the display screen and the input unit of the terminal, so as to classify the plurality of lighting devices of the lighting system under groups, and (iv) transmits the control command for each of the obtained groups via the communication unit so as to control the plurality of lighting devices of the lighting system for each of the groups, at least one of the groups including two or more lighting devices of the lighting system.

2. The lighting system according to claim 1,
wherein the setting information further includes operation information in which control of at least one of dimming and color adjustment by the lighting devices belonging to the corresponding one of the groups is associated with a corresponding one of the at least one attribute indicated by the attribute information, and the controller identifies the control of the at least one of the dimming and the color adjustment associated with the at least one attribute of the lighting devices belonging to the corresponding one of the groups, with reference to the operation information and the at least one attribute, and performs the identified control.

3. The lighting system according to claim 2,
wherein the operation information includes dynamic operation information associated with dynamic control depending on time of a day, for each of the at least one attribute indicated by the attribute information and for the control of the at least one of the dimming and the color adjustment by the lighting devices belonging to the corresponding one of the groups, and the controller identifies dynamic control of the at least one of the dimming and the color adjustment associated with the at least one attribute of the lighting devices belonging to the corresponding one of the groups, with reference to the dynamic operation information and the at least one attribute, and performs the identified dynamic control.

4. The lighting system according to claim 2,
wherein the setting information includes a plurality of lighting plans in each of which one of the at least one attribute and the operation information are associated with each other, and the controller controls the plurality of lighting devices for each of the groups, according to one of the lighting plans which has been selected through a dialog with the operator using the display screen and the input unit.

5. The lighting system according to claim 1,
wherein the controller further displays the plurality of icons corresponding to the plurality of lighting devices classified under the groups on the display screen, and when an instruction for moving icons belonging to one of the groups to another one of the groups has been received by the input unit, reclassifies the plurality of lighting devices according to the instruction.

6. A terminal device which controls a plurality of lighting devices, and configured to access a server device via a communication network,
wherein the terminal includes:
a display screen;
an input unit configured to receive an instruction from an operator;
a communication unit configured to transmit a control command for causing the plurality of lighting devices to perform lighting control; and
a controller,
the server device stores, for installation of a plurality of lighting systems, a plurality of pieces of setting information related to the installation of the plurality of lighting systems, respectively,
before the installation of the plurality of lighting systems is performed, the plurality of pieces of setting information:
are generated to each include pairs of attribute information each of which indicates at least one attribute of an installation location of corresponding one or more of a plurality of lighting devices and number-of-devices information indicating the number of the corresponding one or more of the plurality of lighting devices installed at the installation location; and
are uploaded by a computer device via the communication network, the controller: (i) selects, after installation of a lighting system among the plurality of lighting systems is completed, setting information related to completed installation of the lighting system among the plurality of pieces of setting information stored in the server device, based on the instruction received by the input unit, (ii) downloads the setting information related to the completed installation from the server device via the communication network to obtain the setting information related to the completed installation, (iii) associates each of the plurality of lighting devices of the lighting system with any of the at least one attribute indicated by the attribute information included in the obtained setting information according to a dialog with the operator using a display screen and an input unit of the terminal, so as to classify the plurality of lighting devices of the lighting system under groups, and (iv) transmits the control command for each of the obtained groups via the communication unit so as to control the plurality of lighting devices of the lighting system for each of the groups.

7. A method for setting a lighting system including a plurality of lighting devices, the method comprising:
generating, by a computer device which accesses a server device via a communication network, a plurality pieces of setting information related to an installation of a plurality of lighting systems including the lighting system, and each including pairs of attribute information each of which indicates at least one attribute of an installation location of corresponding one or more of a plurality of lighting devices and number-of-devices information indicating the number of the corresponding one or more of the plurality of lighting devices installed at the installation location;

uploading, by the computer device via the communication network, the generated plurality pieces of setting information to the server device before the installation of the plurality of lighting systems is performed; and after the installation of the lighting system among the plurality of lighting systems is completed, (i) selecting setting information related to completed installation of the lighting system among the plurality of pieces of setting information stored in the server device, based on a user instruction, (ii) downloading, by the terminal which controls the plurality of lighting devices of the lighting system, the setting information uploaded to the server device to the terminal, and (iii) associating each of the plurality of lighting devices of the lighting system with any of the at least one attribute indicated by the attribute information included in the obtained setting information according to a dialog with the lighting designer using a display screen and an input unit of the terminal, so as to classify the plurality of lighting devices of the lighting system under groups.

8. A lighting system, comprising:
a plurality of lighting devices;
a server device;
a computer device configured to access the server device via a communication network; and
a terminal which controls the plurality of lighting devices, and is configured to access the server device via the communication network, wherein the server device stores, for installation of a plurality of lighting system including the lighting system, a plurality of pieces of setting information related to the installation of the lighting system, respectively, before the installation of the plurality of lighting systems is performed, the plurality of pieces of setting information are generated each to include pairs of attribute information each of which indicates at least one attribute of an installation location of corresponding one or more of a plurality of lighting devices and number-of-devices information indicating the number of the corresponding one or more of the plurality of lighting devices installed at the installation location; and are uploaded by the computer device via the communication network, and wherein the terminal includes:

a display screen;

an input unit configured to receive an instruction from an operator;

a communication unit configured to transmit a control command for causing the plurality of lighting devices to perform lighting control; and a controller which (i) selects, after installation of the lighting system is completed, setting information related to completed installation of the lighting system among the plurality of pieces of setting information stored in the server device, based on the instruction received by the input unit, (ii) downloads the setting information related to the completed installation from the server device via the communication network to obtain the setting information related to the completed installation (iii) associates each of the plurality of lighting devices of the lighting system with any of the at least one attribute indicated by the attribute information included in the obtained setting information according to a dialog with the operator using the display screen and the input unit of the terminal, so as to classify the plurality of lighting devices of the lighting system under groups, and (iv) transmits the control command for each of the obtained groups via the communication unit so as to control the plurality of lighting devices for each of the groups, at least one of the groups including two or more lighting devices of the lighting system.

9. The lighting system according to claim 8, wherein:

the setting information further includes operation information in which control of at least one of dimming and color adjustment by the lighting devices belonging to the corresponding one of the groups is associated with a corresponding one of the at least one attribute indicated by the attribute information, and the controller identifies the control of the at least one of the dimming and the color adjustment associated with the at least one attribute of the lighting devices belonging to the corresponding one of the groups, with reference to the operation information and the at least one attribute, and performs the identified control.

10. The lighting system according to claim 9, wherein:

the operation information includes dynamic operation information associated with dynamic control depending on time of a day, for each of the at least one attribute indicated by the attribute information and for the control of the at least one of the dimming and the color adjustment by the lighting devices belonging to the corresponding one of the groups, and the controller identifies dynamic control of the at least one of the dimming and the color adjustment associated with the at least one attribute of the lighting devices belonging to the corresponding one of the groups, with reference to the dynamic operation information and the at least one attribute, and performs the identified dynamic control.

11. The lighting system according to claim 9, wherein:

the setting information includes a plurality of lighting plans in each of which one of the at least one attribute and the operation information are associated with each other, and the controller controls the plurality of lighting devices for each of the groups, according to one of the lighting plans which has been selected through a dialog with the operator using the display screen and the input unit.

12. The lighting system according to claim 8, wherein the controller further displays the plurality of icons corresponding to the plurality of lighting devices classified under the groups on the display screen, and when an instruction for moving icons belonging to one of the groups to another one of the groups has been received by the input unit, reclassifies the plurality of lighting devices according to the instruction.

* * * * *